United States Patent [19]

Paul

[11] Patent Number: 5,340,518

[45] Date of Patent: Aug. 23, 1994

[54] METHOD FOR CORRUGATING SHEET MATERIAL

[75] Inventor: William C. Paul, Mt. Vernon, Ind.

[73] Assignee: General Electric Co., Pittsfield, Mass.

[21] Appl. No.: 960,489

[22] Filed: Oct. 13, 1992

[51] Int. Cl.⁵ .............................................. B29C 53/24
[52] U.S. Cl. ..................................... 264/154; 264/160; 264/286
[58] Field of Search ......................... 264/286, 154, 160

[56] References Cited

U.S. PATENT DOCUMENTS

| | | | |
|---|---|---|---|
| 2,547,736 | 4/1951 | Blake | 264/286 |
| 2,547,763 | 4/1951 | Land et al. | 264/287 |
| 3,024,496 | 3/1962 | Colombo | 264/286 |

FOREIGN PATENT DOCUMENTS

| | | | |
|---|---|---|---|
| 805733 | 12/1958 | United Kingdom | 264/290.2 |
| 871329 | 6/1961 | United Kingdom | 264/286 |

*Primary Examiner*—James Lowe

[57] ABSTRACT

A method for continuously producing corrugated sheet from a supply of material having low melt strength at the forming temperature includes a heater, a pair of interdigitated thermo-forming rollers for corrugating the sheet as it exits the heater and a closely coupled calibrator at the outlet end of the thermo-forming rollers. A carrier maintains lateral tension on the sheet as it is heated, thermo-formed and calibrated so as to maintain its uniform lateral width. The thermo-forming rollers and calibrator form and maintain the corrugations until the material cools to below the glass transition temperature. A method for producing the corrugations is likewise disclosed.

29 Claims, 9 Drawing Sheets

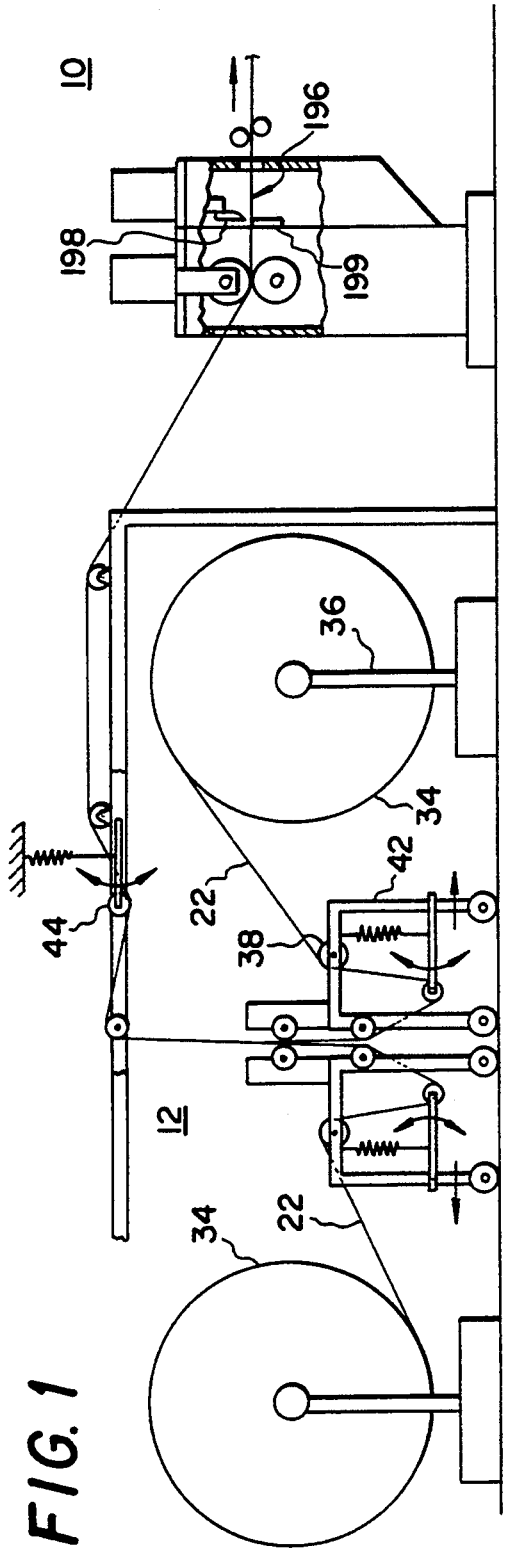
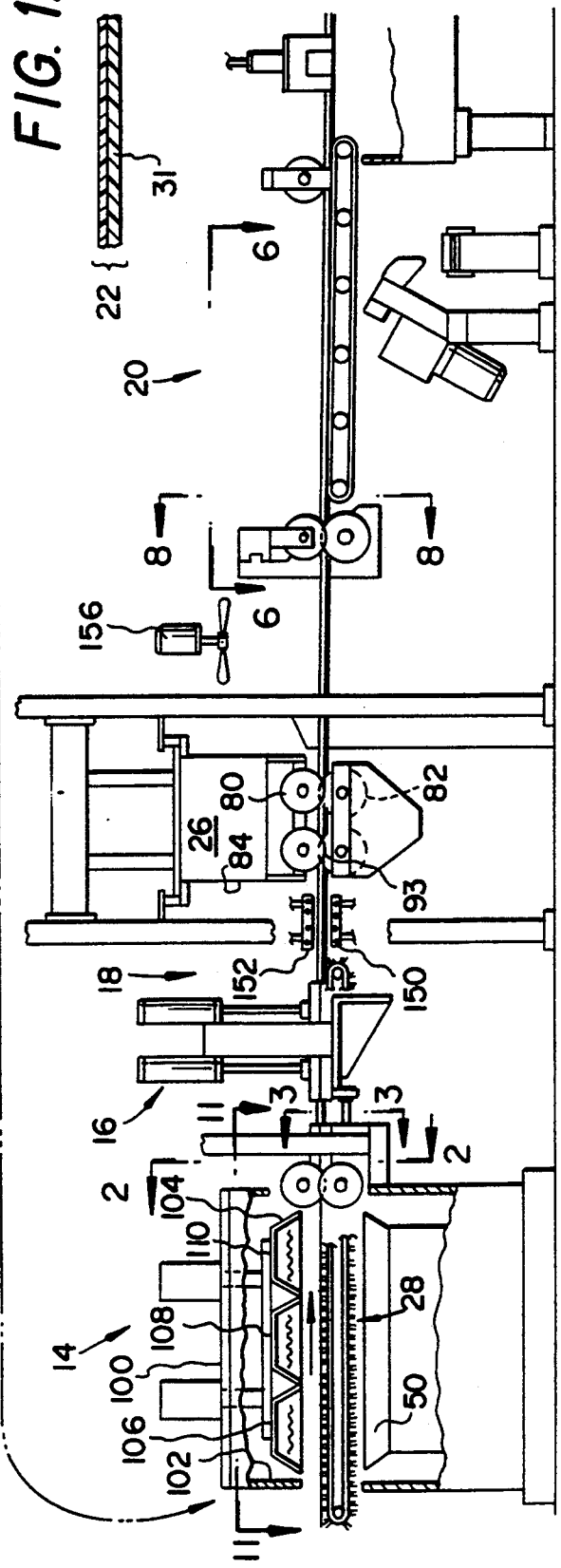
FIG. 1
FIG. 1A

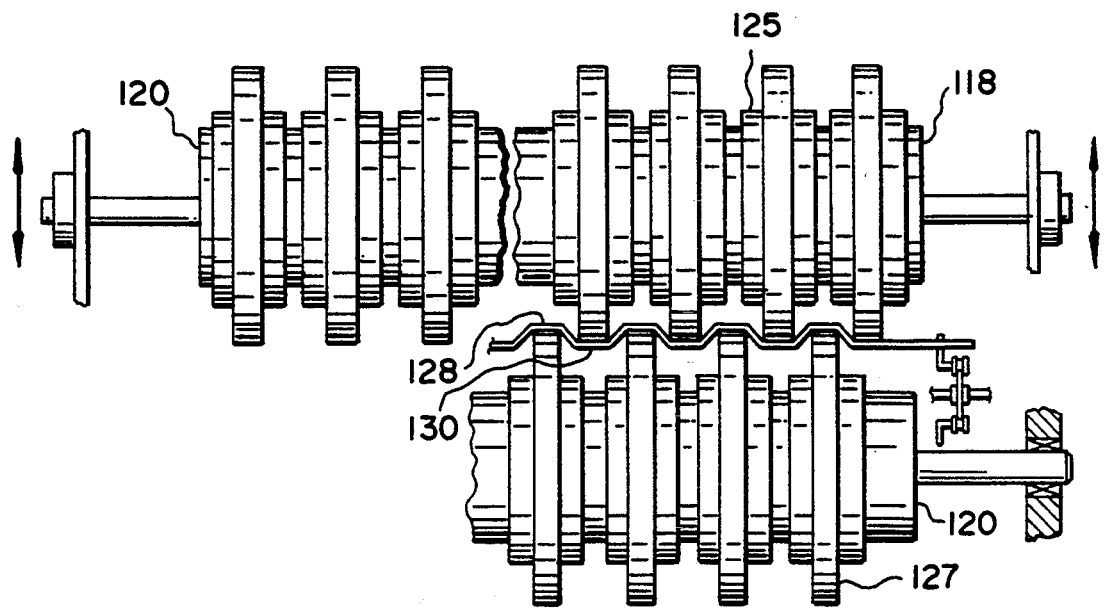
FIG. 2
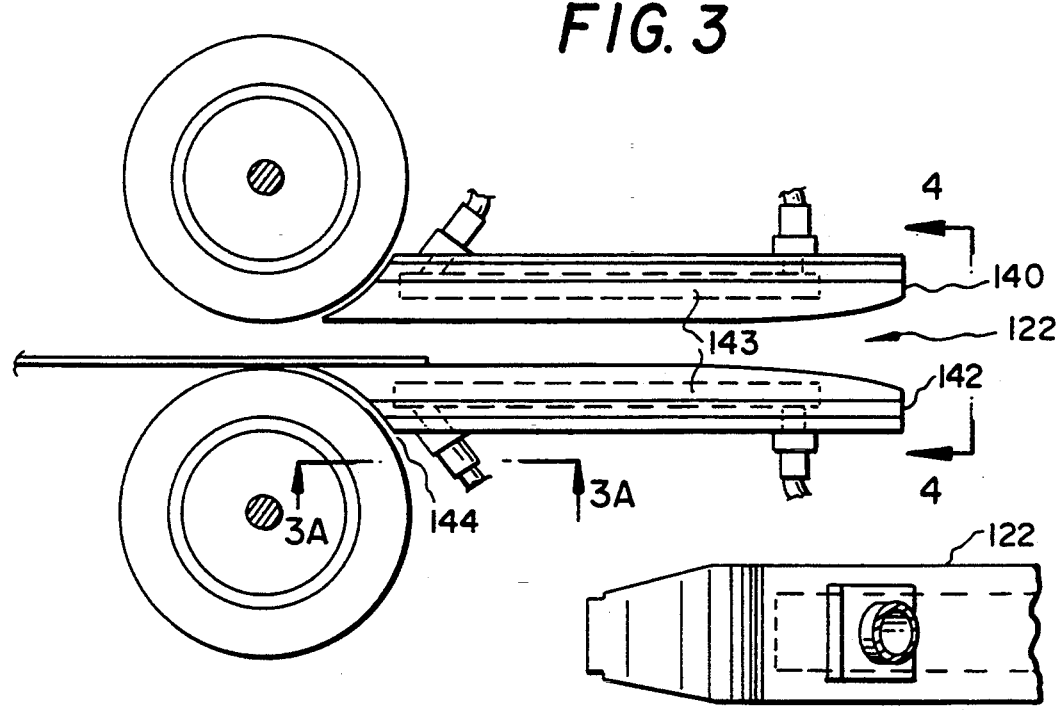
FIG. 3
FIG. 3A

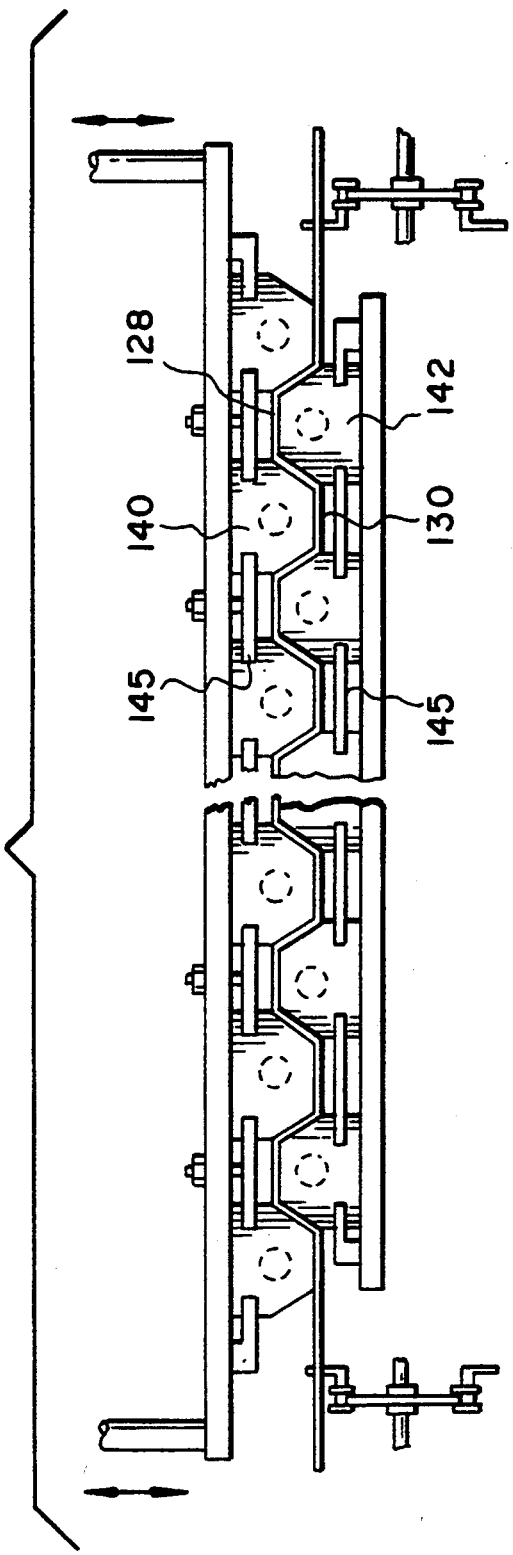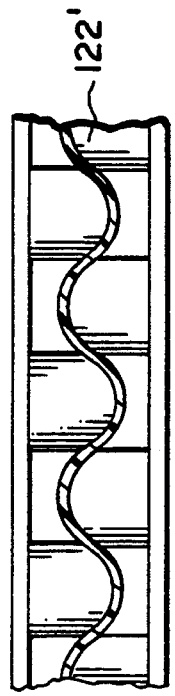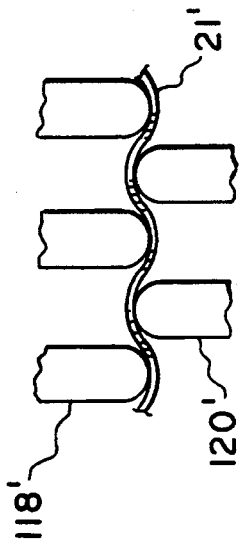

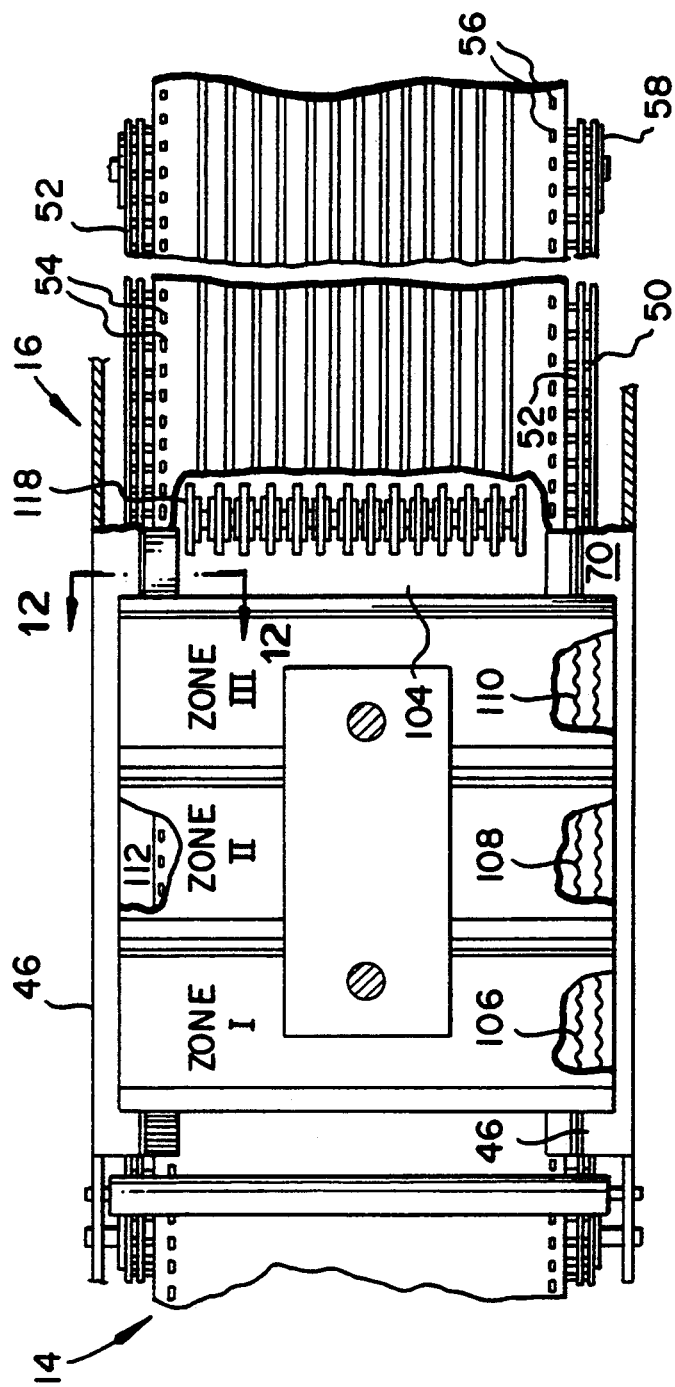

METHOD FOR CORRUGATING SHEET MATERIAL

BACKGROUND OF THE INVENTION

The invention is directed to a method and apparatus for thermo-forming sheet material, and particularly to a method and apparatus for corrugating amorphous materials having low melt strength at forming temperatures.

High melt strength sheet materials may be corrugated by drawing or extruding heated sheet material through a calibrator having the profile corresponding to the desired final shape. Low melt strength materials may not be readily formed by this method because pulling or drawing forces may exceed the strength of the material above the glass transition temperature. If the material is extruded below the glass transition temperature, the pulling force may be excessive and, in addition, the sheet material may be damaged by the calibrator or extruder friction. One way to reduce the friction is to use rollers to deform the sheet material. However, certain materials such as polycarbonates have the tendency to shrink back from the deformed shape as the material cools below the glass transition temperature.

The use of deforming rollers and a calibrator has also proved ineffective because the materials tend to pull back from the deformed shape before calibration can be effected. Thus, although the rollers prevent initial damage, the calibrator friction causes damage.

A need therefore exists for a method and apparatus for corrugating sheet material having low melt strength at forming temperatures.

SUMMARY OF THE INVENTION

The present invention obviates and eliminates the disadvantages and shortcomings of the described prior arrangements. In particular, the present invention is based upon the discovery that a pair of thermo-forming rollers and a calibrator having an inlet in closely spaced conforming relationship with the deforming rollers is capable of producing corrugated thermo-formed sheet.

In a particular embodiment, the invention is directed to an apparatus for continuously corrugating a supply of thermo-formable sheet material having a low melt strength at forming temperatures comprising means for laterally engaging the sheet and transporting it from a supply through a forming stage at a selected rate. The apparatus further includes a heating zone for receiving the sheet material therein and for raising its temperature to the forming temperature. A pair of opposed interdigitated forming rollers adjacent the heating zone outlet receives the sheet material therebetween in a nip for thermo-forming corrugations in the sheet. A cooled calibrator having a profile corresponding to the formed corrugation receives the thermo-formed sheet and maintains the thermo-formed corrugations therein until the material cools below the forming temperature. The calibrator has an upstream end shaped for closely conforming to the rollers and is disposed in close proximity to the nip of the forming rollers. A differential drive simultaneously carries the thermo-formable sheet through the heating zone and into the thermo-forming region and draws the thermo-formed sheet from the calibrator at a draw rate greater than the feed rate.

In another embodiment, the invention comprises an apparatus for continuously producing corrugated sheet from a supply of sheet material having low melt strength at the forming temperature comprising a carrier for supporting and maintaining the width of a supply of the sheet material along a longitudinal path. An oven in the path has a plurality of heating stages. The oven receives the sheet material at an inlet end thereof and raises the temperature of the sheet material to its forming temperature near an outlet end thereof. A pair of opposed interdigitated forming rollers located transversely of the path is closely coupled to the outlet of the oven and receives the sheet material heated to its forming temperature therebetween. The forming rollers form corrugations in the heated sheet. A cooled calibrator located in the path closely adjacent to the forming rollers has a profiled inlet end transverse of the path. The profiled inlet end engages the forming rollers in closely spaced conforming relation for capturing the heated corrugated sheet therein immediately after thermo-forming. The calibrator has interdigitated profiled surfaces extending from the inlet end along the path to an outlet end for maintaining the corrugations in the sheet as the heated sheet cools below its forming temperature.

In yet another embodiment, the invention comprises a method for continuously producing corrugated sheet from a supply of sheet material having a low melt strength at forming temperatures by: heating the material to a forming temperature just above the glass transition temperature; thermo-forming material with rollers while it is above the glass transition temperature; capturing the thermo-formed sheet material for calibration while above its glass transition temperature; and calibrating and cooling the material to below its glass transition temperature.

DESCRIPTION OF THE DRAWINGS

FIG. 1 is an overall schematic side view of a multi-stage apparatus for thermo-forming low melt strength materials in accordance with the present invention;

FIG. 1A is a fragmentary side sectional view of an exemplary thermo-formable sheet material useful in the present invention;

FIG. 2 is an end view of the thermo-forming rollers;

FIG. 3 is a side view of the forming rollers and the calibrator;

FIG. 3A is a fragmentary detail in top plan view of a calibrator element;

FIG. 4 is an end view of the calibrator taken along line 4—4 of FIG. 3;

FIGS. 5A and 5B are fragmentary end views of alternative forming rolls and an alternative calibrator, respectively;

FIG. 11 is a top plan view of the oven and secondary drive;

DETAILED DESCRIPTION OF THE INVENTION

Figure 6:
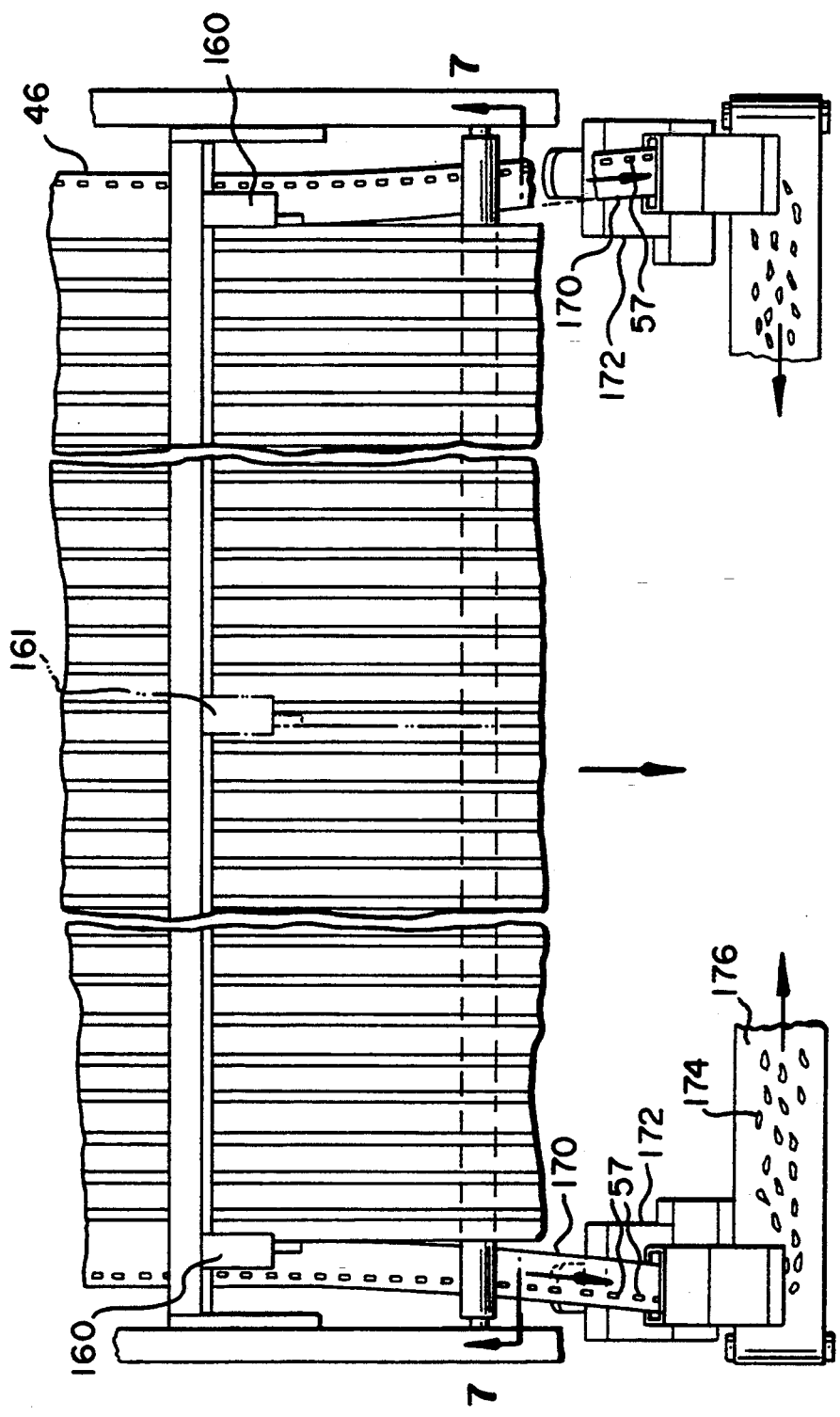
FIG. 6 is a top plan view of an edge trimmer.

A thermo-forming apparatus 10 in accordance with the present invention as illustrated in FIG. 1. The apparatus is a multi-stage system for supplying, heating, thermo-forming, cooling and discharging corrugated sheet formed of a material which has low melt strength at forming temperatures. During heating and thermo-forming, the material is maintained at a selected uniform width to prevent lateral shrinkage.

The apparatus 10 includes a supply stage 12, heater stage 14, a thermo-forming stage 16, a cooling stage 18 and a trim/cut/stack or discharge stage 20. A supply of thermo-formable sheet material 22 is fed from the feed stage 12 through the heater stage 14, the thermo-forming stage 16, the cooling stage 18 and the discharge stage 20 whereupon different operations are performed to produce sized panels 24 cut to length and width. The material or supply 22 is drawn through the apparatus 10 by means of a primary drive 26 downstream of the thermo-forming stage 16. A secondary drive 28 upstream of the primary drive 26 laterally supports the sheet 22 and feeds it through the heater stage 14 and the thermo-forming stage 16. Optionally, the secondary drive may extend through at least a portion of the cooling stage located upstream of the primary drive 26.

Clear corrugated sheet is useful for greenhouse applications. In one embodiment of the present invention, the raw material foxing the sheet 22 comprises a base layer of polycarbonate flat sheet 31 that is co-extruded with a UV stabilized cap layer 32. The thickness of the sheet 22 is dependent upon the application and the finished product thickness. Typically, the thickness for greenhouse applications is 0.033 inch.

The sheet 22 is wound on one or more supply spools 34 which typically contain between 8,000 and 10,000 feet of sheet material 22. The spools 34 are placed into an unwind stand 36 in the supply stage 12. Although not shogun, the spools may also be carried by movable carts into the supply stage 12 in lieu of using a separate unwind stand 36. The spools 34 are threaded over an idler 38 and under a dancer roll 40 in a frame 42 which is retractably mounted in the supply stage 12. An additional series of rollers including a secondary dancer roll 44 is provided to stabilize the supply 22. As illustrated in FIG. 1, a pair of unwind stands 36 and movable frames 42 are provided so as to allow for a resupply of the sheet material 22 as one or the other spool 34 is exhausted.

Figure 12:
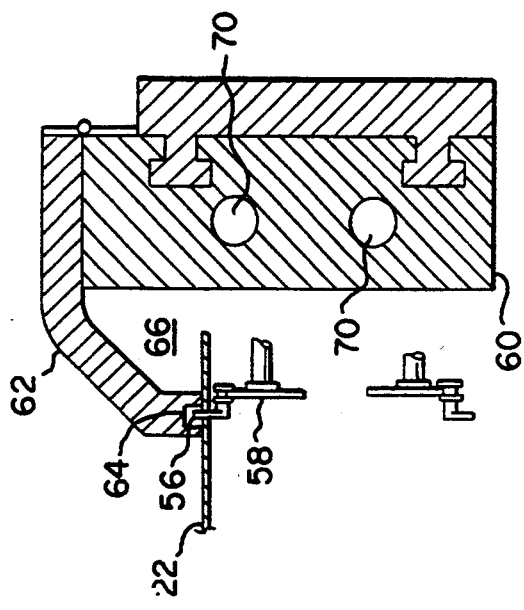
FIG. 12 is a sectional view of the secondary drive taken along line 12—12 of FIG. 11.

The sheet material 22 is supplied in a selected width, e.g., about 59 inches, measured at its marginal edges 46 (FIG. 11). Secondary drive 28 in the form of a chain drive 50 receives the sheet 22 upstream of the supply stage 12. The chain drive comprises a pair of laterally disposed endless chains 52 (FIG. 11) mounted laterally of the sheet 22 and inboard of its marginal edges 46. The chains 52 extend lengthwise of the apparatus 10 upstream of the heater stage 14 and downstream of at least the thermo-forming stage 16. The chains 52 are formed of individual links 54 which carry outwardly radially extending pins 56 (FIG. 11). The chains 52 are mounted on sprockets 58 for endless rotation in chain drive frame 60 as shown, for example, in FIG. 12. A cover 62 may be fixed or hinged to the chain drive frame 60. The cover 62 has a slotted portion 64 which is adapted to receive the pins 56 for motion in a downstream direction. A channel 66 is formed between the cover 62 and the frame 60.

The supply 22 is threaded into the channel 66 near its marginal edges 46. The pins 56 puncture and laterally support the sheet 22 inboard of its marginal edge 46. The channel 66 is elongated laterally so as to tolerate variations in the width of the sheet material 22. The chain 52 and sprockets 58 which are driven by a motor or a chain drive (not shown) pulls the sheet 22 in the upstream direction through the heater stage 14 and thermo-forming stage 16. At the downstream end of the chain drive 50 near the thermo-forming stage 16, the pins 56 and downstream sprockets 58 disengage from the sheet 22 thereby releasing the lateral support.

Cooling channels 70 are provided in the frame 60 to maintain the temperature of the chain drive 50 at a desired level which is below the melting point or glass transition temperature of the sheet 22 so as to permit the pins to continuously support the sheet through the heating and thermo-forming stages 14 and 16.

Figure 9:
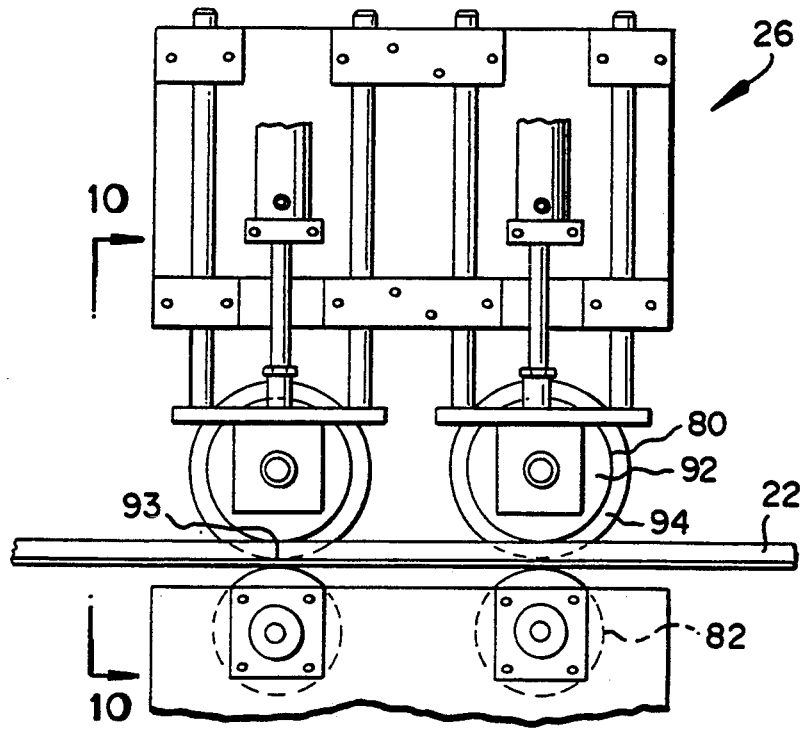
FIG. 9 is a side view of the primary drive.
Figure 10:
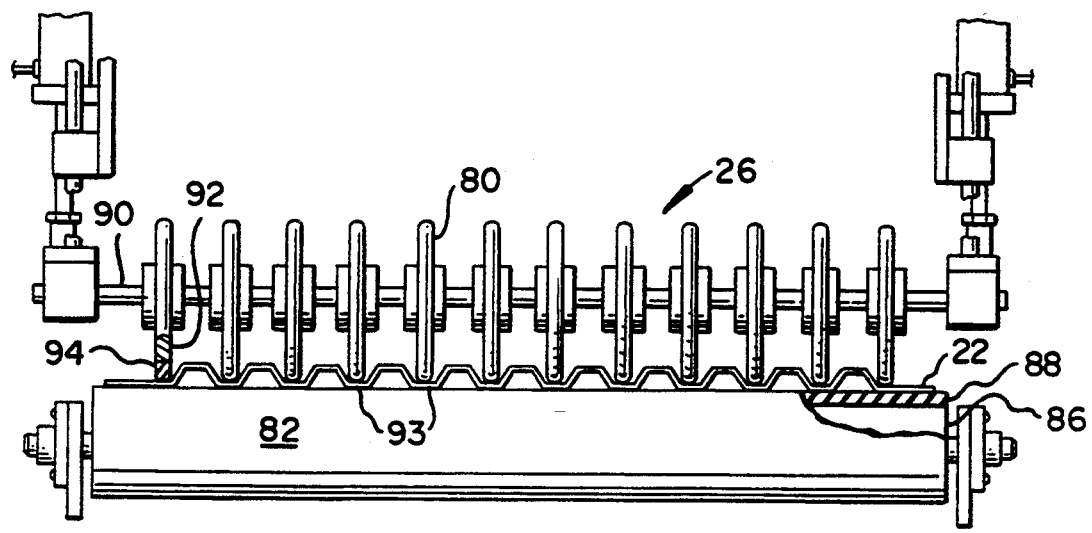
FIG. 10 is an end view of the primary drive.
Figure 13:
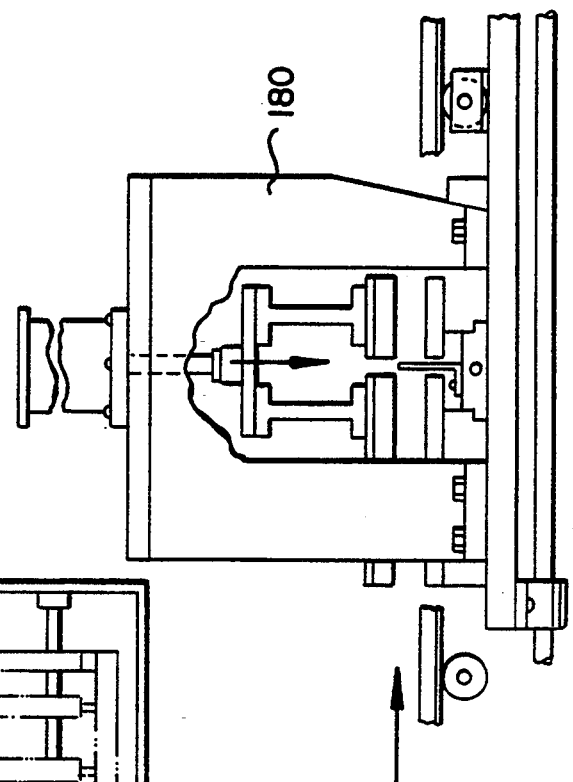
FIG. 13 is a top plan view of the panel cutter.
Figure 14:
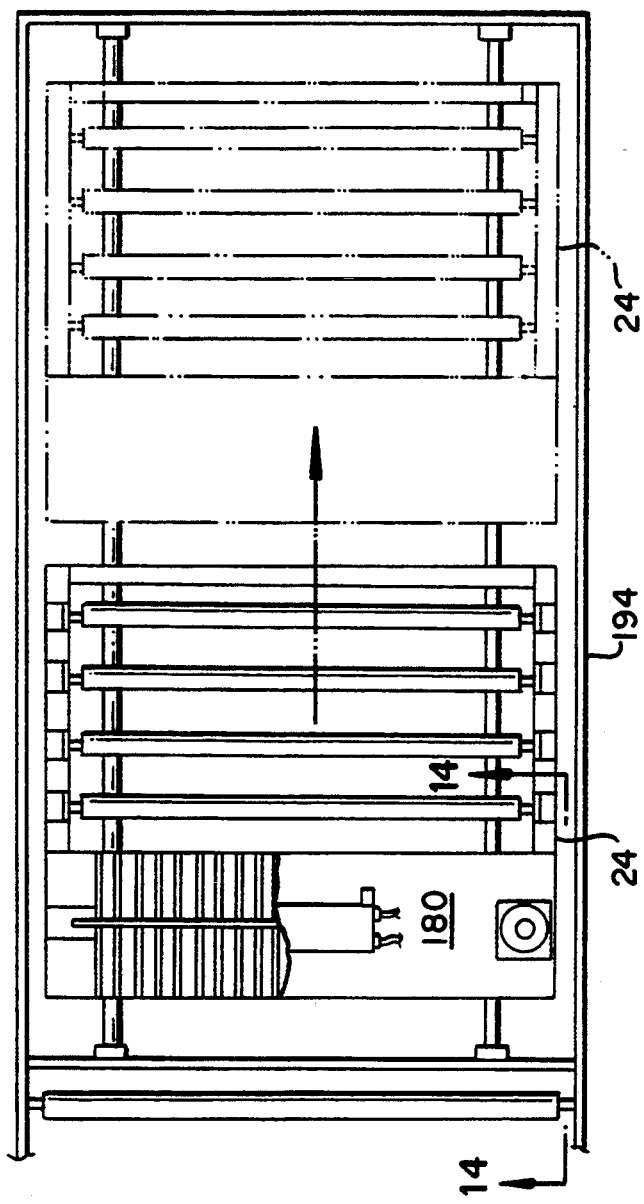
FIG. 14 is a side sectional view of the panel cutter taken along line 14—14 of FIG. 13.
Figure 15:
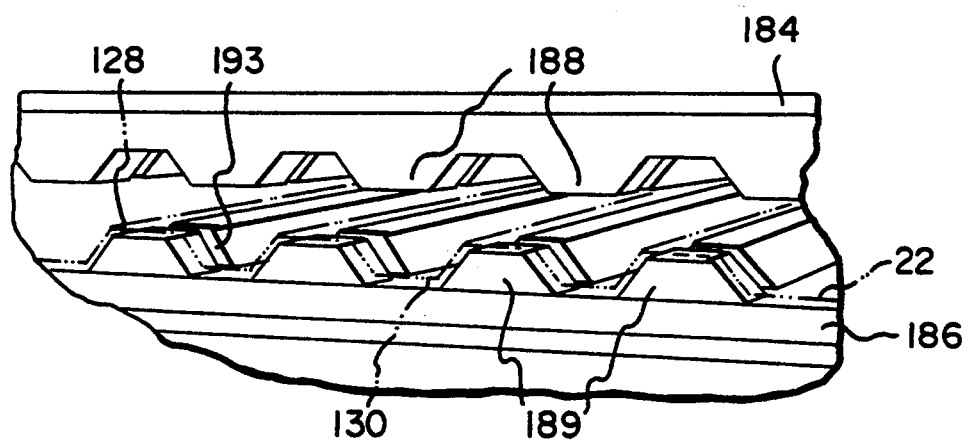
FIG. 15 is a fragmentary perspective of the clamping jaws in the panel cutter.
Figure 16:
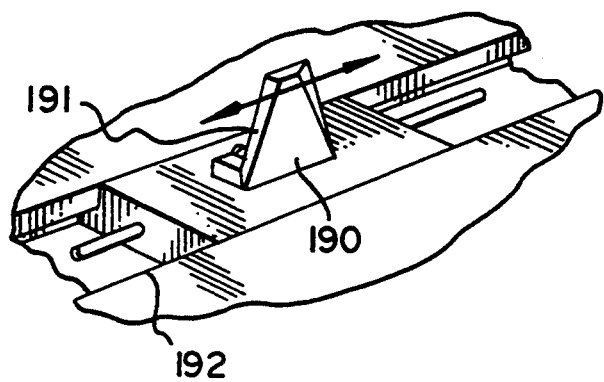
FIG. 16 is a fragmentary perspective of the panel cutting knife.

The primary drive 26, as illustrated in FIGS. 9 and 10, engages the sheet 22 downstream of the thermo-forming stage 16 for drawing it therethrough at a selected draw rate. In the embodiment illustrated the primary drive 26 comprises a pair of spaced apart upper drive rollers 80 and power driven backup rollers 82 mounted in a frame 84. The backup rollers 82 are formed of a metal core 86 which carries a resilient sleeve 88. Primary drive rollers 80 engage the thermo-formed sheet material 22 from the top side and drive the sheet 22 in the upstream direction. The drive rollers 80 generally comprise a metal core or shaft member 90 carrying a plurality of spaced apart annular drive wheels 92 each of which has a resilient annular sleeve or cover 94. In operation, the drive rollers 80 and backup rollers 82 engage the sheet material 22 therebetween, for drawing sheet 22 through the apparatus. When the sheet material 22 has been thermo-formed with corrugations, the spaced apart annular drive rollers 80 engage the sheet material 22 at a nip formed with the power driven backup rollers 82 between the corrugations without damaging the structure or surface of the thermo-formed material.

The heater stage 14 (FIGS. 1 and 11) generally comprises an enclosed housing 100 having an open inlet or upstream end 102 and a downstream or outlet end 104. Disposed within the housing 100 are a plurality of separately temperature control heater units 106, 108 and 110. The sheet material 22 is carried through the housing 100 from the inlet 102 to the outlet 104 past each of the heater units 106, 108 and 110. The temperature of the heating stage 14 is gradually increased between the inlet 102 and the outlet 104 to bring the temperature of the sheet material 22 just above glass transition temperature $T_g$ at the outlet 104. The heater unit 106 initially raises the temperature of the sheet material 22 from room temperature to about $T_g/2$. Of course, different materials may have different glass transition temperatures and may require variations in the temperature build up. In the embodiment illustrated for the polycarbonate sheet, the initial heater unit 106 in Zone I operates at about 200° F. The heating unit 110 in Zone III near the outlet 104 of the housing 100 operates at some temperature above $T_g$ in which the sheet material 22 is thermo-formable but which retains its integrity within the apparatus. For the exemplary polycarbonate sheet material 22 discussed the temperature of the final heating Zone III is about 380° F.

The intermediate heat Zone II is operated at a temperature or temperatures near $T_g$ of the sheet 22. In the arrangement illustrated, the temperature of the intermediate heating Zone II ranges from above 1.03 $T_g$ to about 0.9 $T_g$. In the arrangement illustrated, the temperature of the intermediate heater 108 is highest near the marginal edges 46, e.g., about 1 to 3 percent higher than $T_g$ to about 0.9 $T_g$ near the center of the sheet 22. The reason for the grading of the temperature across the sheet 22 is to compensate for heat losses which may occur near the lateral margins 112 of each of the heating elements 106, 108 and 110. If desired, each of the heating zones may be temperature controlled to provide a gradiation of temperature across the sheet 22.

The thermo-forming stage 16 is located in close proximity to the outlet 104 of the heating stage 14. Thus, the sheet material 22 is carried into the thermo-forming stage 16 at or above $T_g$ its thermo-forming temperature. Of course the thermo-forming stage 16 may be spaced from the heating stage 14 if desired. However, it has been found that closely spacing the respective heating and thermo-forming regions 14 and 16 results in satisfactory thermo-forming of the sheet material 22.

The thermo-forming stage 16 comprises a pair of interdigitated temperature controlled, power driven thermo-forming rollers 118 and 120 which receive the sheet material 22 therebetween from the outlet 104 of the heating stage 14. The thermo-forming rollers 118 and 120 are sometimes mentioned with reference to their respective upper and lower positions.

A calibrator 122 is closely coupled to the downstream side of the thereto-forming rollers 118 and 120. In accordance with the invention, the thermo-forming rollers 118 and 120 deform the sheet material 22 above the thermo-forming temperature and the calibrator 122 captures and maintains the shape of the thermo-formed material as it cools below the glass transition temperature.

As illustrated in FIG. 2, the rollers 118 and 120 each comprise a respective core roller 124 and 125 and a plurality of axially spaced annular forming rollers 126 and 127. The rollers 118 and 120 are adjustable along the core 124 and 125 and are arranged so that the annular forming rollers 126 and 127 are interdigitated as shown. The rollers 126 and 127 are each removable from its core 124 and 125. The sheet material 22 is captured between the forming rollers 118 and 120 whereby it is formed into the corrugated shape shown having peaks 128 and troughs 130 corresponding to the deformations attributable to the respective lower and upper annular forming rollers 126 and 127.

The core rollers 124 and 125 may include internal passages (not shown) for receiving a temperature controlled supply of fluid, (e.g., heated water) therethrough. The heated water maintains the thermo-forming rollers 118 and 120 at the proper forming temperature. In the embodiment illustrated, the forming rollers 118 and 120 are driven by an electric motor (not shown) and are syncronized with the secondary drive 28.

The forming rollers 126 may be readily removed from the core rollers 124 and 125 and alternative rollers may be substituted having different profiles to change the shape of the corrugations. For example, different height and width and curative profiles may be readily achieved.

As illustrated in FIG. 3, the calibrator 122 is located on the downstream side of the forming members 118 and 120 in closely conforming spaced relationship. The calibrator 122 comprises a pair of spaced apart interdigitated members 140 and 142. The upper members 140 engage the valleys 130 of the thermo-formed sheet material 22 and the lower members 142 engage the peaks 128 of the deformed sheet whereby the corrugated shape is maintained as the sheet material 22 is drawn therethrough.

As illustrated in FIG. 3, the respective upper and lower calibrator members 140 and 142 each have an upstream end 144 and a downstream end 146. The upstream end 144 is shaped so as to closely conform with the shape of the respective forming rollers 118 and 120 (FIG. 3A). That is, the upstream ends 144 of the calibrating members 140 and 142 are in closely spaced conforming relationship with the corresponding forming rollers 118 and 120. This arrangement allows the sheet material 22 to be readily captured as soon as possible after it leaves the foxing rollers 118 and 120. It has been found that if the calibrator 122 is spaced from the forming rollers 118 and 120, materials having low melt strength at the forming temperature tend to shrink back from the deformed shape and at the same time cool so that the desired degree of corrugation is not readily achieved. If the temperature of the sheet material 22 falls below the forming temperature, the calibrator 122 may temporarily deform it, but the desired deformation will not be maintained after the sheet material leaves the downstream end 146. Thus, in accordance with the present invention, the purpose of the forming rollers 118 and 120 is to form the corrugations, namely the peaks and valleys 128 and 130, and the purpose of the calibrator 122 is to hold and maintain the desired shape of the corrugated sheet while allowing the material to cool below the glass transition temperature whereby the deformations will set at the desired shape. The close proximity of the calibrator elements 140 and 142 to the corresponding forming rollers 118 and 120 achieves this purpose and in addition prevents undesirable thermo-deformations including sag, warpage and twisting of the thermo-formed sheet.

The calibration members 140 and 142 each have a cooling channel 143 which extend from near the inlet 144 to near the outlet 146. The cooling channels 143 receive a cooling fluid, (e.g., water) whereby the temperature of the calibrator 122 is maintained at an appropriate temperature for assuring proper thermo-forming of the sheet.

The calibration members 140 and 142 are laterally spaced apart by means of intermediate spacers 145 which match the spacing of the annular foxing rollers 126 and 127. The shape and space of the calibrator members 140 and 142 are adaptable and may be matched to the forming rollers 118 and 120 to achieve a desired sheet profile. The profile of the forming rolls 118 and 120 and calibrator 122 may be readily varied as illustrated by the alternative forming rolls 118' and 120' and calibrator structures 122' shown in FIGS. 5A and 5B, respectively.

As the sheet material is carried through the thermo-forming stage 16, the chain drive 50 maintains lateral tension on the sheet material 22 to thereby maintain its lateral width while under deformation. As the deformed sheet material 22 leaves the thermo-forming stage 16, the chain drive 50 disengages from the material as illustrated.

Cooling stage 18, downstream of the thermo-forming stage 16, provides forced cooling for the sheet material 22 (FIG. 1). The cooling stage may comprise a pair of platens 150 disposed in confronting relation at opposite sides of the sheet material 22. The platens 150 may be formed with flow channels 152 coupled to a source of cooling fluid, (e.g., water). The cooling stage 18 may also include one or more supplemental air blowers 156. In the embodiment illustrated, the cooled platens 150 are located immediately downstream of the thermo-forming stage 16 and the blower 156 is downstream of the primary drive 26.

In the primary drive 26 (FIGS. 9 and 10), the rollers 80 including the annular wheels 92 engage the valleys 130 of the deformed sheet 22 and the cylindrical back up roller 82 engages the under side of the sheet opposite the primary rollers 80. As illustrated, both the back up rollers 82 and the annular drive wheels 92 have 4 corresponding rubber sleeves 88 and 94. The drive backup rollers 82 impart appropriate pulling force on the corrugated sheet 22. The sleeves 88 and 94 resiliently engage the sheet 22 at nips 93. This resilient gripping action prevents damage to the sheet by virtue of the engaging driving wheels.

Figure 7:
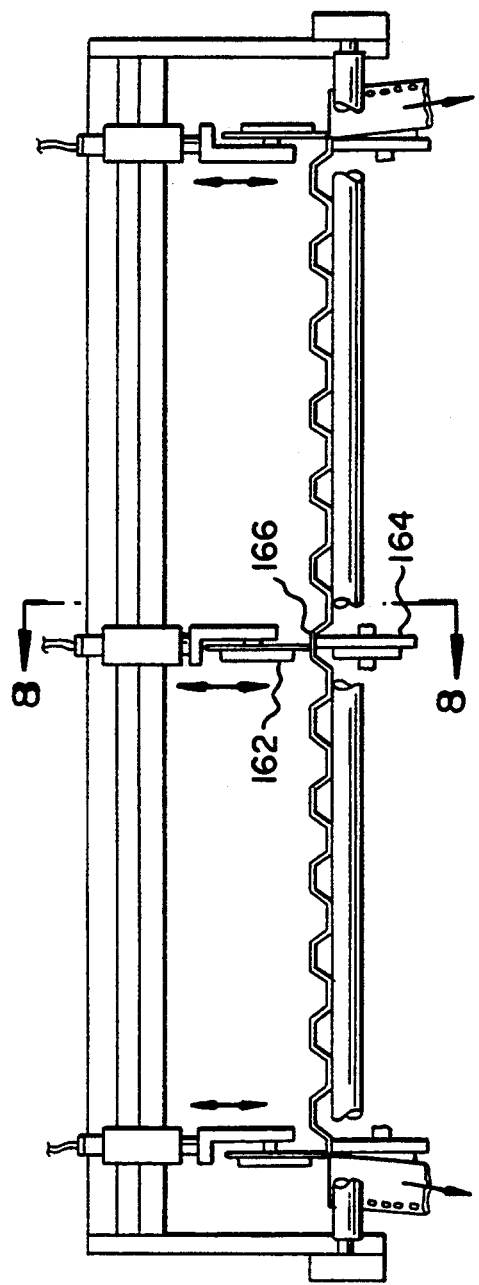
FIG. 7 is an end sectional view of the trimmer taken along line 7—7 of FIG. 6.
Figure 8:
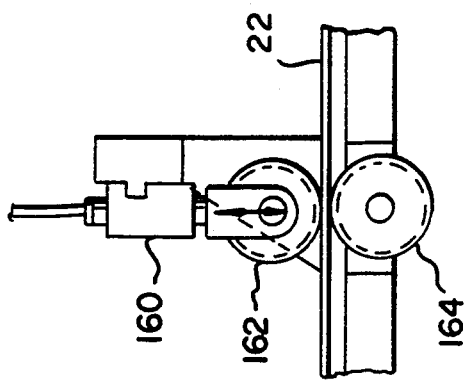
FIG. 8 is a side view of the trim knife taken along line 8—8 of FIG. 7.

As shown in FIGS. 6, 7 and 8, the discharge stage 20 may have a plurality of outboard width trim knives 160 each of which includes a cutting roller 162 for engaging the sheet material 22 from the top side and a backing roller or mandrel 164 having a stepped edge 166 with which the cutting blade 162 slits the sheet material lengthwise as it passes through the discharge stage 20 in the downstream direction as illustrated.

Generally, at least two width cutting knives 160 are provided which may be laterally adjusted with respect to the sheet material 22 for cutting various widths. If desired, one or more additional centrally located width cutting knives 161 the width may be employed to cut additional widths from the overall sheet.

The outboard knives 160 act as edge cutters for trimming excess material 170 near the marginal edges 46 inboard of the sprocket holes 57. The excess material 170, trimmed from the sheet material 22, is directed into chopper units 172 downstream of trim cutters 162. The choppers 172 are motor driven and discharge chopped sheet material 174 onto conveyor belts 176 for recycling.

Referring to FIGS. 13–16, individual panels 24 are cut from the trimmed sheet material 22. A panel cutter 180 is provided to cut panels 24 for stacking in or transport from the discharge stage 20. The panel cutter 180 includes upper and lower clamping members 184 and 186 which engage opposite sides of the formed sheet member 22. The upper and lower clamping 184 and 186 members have interdigitated fingers 188–189 which engage the respective valleys and peaks formed in opposite sides of the sheet 22. A reciprocal two edged knife 190 rides in a channel 192 in the upper clamping member 184 and has a double edge 191 which extends into a slot 193 in the lower member 186. The knife 190 moves in either direction transversely of the formed sheet 22 cutting through each of the respective peaks and troughs 128 and 130 as illustrated. The panel cutter 180 may be mounted on a cutting table 194 downstream of the cooling stage 18. The upper and lower clamping members 184 and 186 move together in order to securely engage the moving sheet 22 allowing the cutter 180 to move downstream of the table 194. As the cutter 190 moves downstream, the reciprocal knife 190 enters slot 193 and is moved transversely to cut the sheet 22 forming the panels 24. The reciprocal knife 190 remains at rest at one side or another of the channel 192 and the clamping men%bets 184 and 186 separate to release the cut panel 24. Thereafter the panel cutter 180 moves upstream to again engage the formed sheet 22. The knife 190 is then moved in the opposite direction to cut with the two-sided blade 191. The panel cutter 180, the clamping members 184 and 186 and knife 191 may be hydraulically actuated by air or electric motors or the like.

In order to provide for proper threading and for emergency termination of thermo-forming, shear cutter 196 may be located upstream of the supply stage 12 as shown in FIG. 1. The shear cutter 196 has a pair of blades 198 and 199 which are located on opposite sides of the sheet material 22. The shear blades 198 and 199 may rapidly engage to terminate the feed of material to the heater section 14. Additional shear cutters (not shown) may be provided at other locations as desired.

The various actuators in the system may be hydraulic or electrically operated. In one embodiment of the invention, the unwind stand 36 is hydraulically actuated. The shear cutter 196 and the panel cutter 180 in the discharge stage 20, and the primary and secondary drives 26 and 28 are typically electrically driven.

In accordance with the present invention, the secondary drive 28 is operated at a speed which is a percentage of the drive speed of the primary drive 26. The sheet material 22 is thus maintained under tension as it is drawn through the thermo-forming stage 16. In the embodiment illustrated, the secondary drive 26 operates at about 95 percent of the linear pull speed of the primary drive 26. Different materials require suitable adjustments to the differential speed of between the respective primary and secondary drive 26 and 28.

In accordance with the invention, there has been provided a method for thermo-forming materials having low melt strength at the forming temperature including: laterally supporting the material prior to thermo-forming; heating the material up to a thermo-forming temperature near its glass transition temperature; thermo-forming the material above its glass transition temperature immediately after heating; calibrating the thermo-formed material by capturing it proximate the thermo-forming step whereby the calibration occurs above the glass transition temperature; and maintaining said deformation while cooling the material to below the glass transition temperature.

The method also includes differentially driving the sheet material at a first driving speed subsequent the deformation which is higher than a second driving speed prior to thermo-deformation.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed:

1. A method of continuously producing corrugated sheet from a supply of a material having low melt strength at the forming temperature comprising:
   gradually heating the sheet material to a forming temperature above the glass transition temperature;
   thermo-forming corrugations in the sheet material with rollers while the sheet material is above the glass transition temperature;

capturing the corrugated sheet for calibration while above the glass transition temperature; and calibrating and cooling the material to below the glass transition temperature immediately subsequent to thermo-forming the corrugations in the sheet while simultaneously maintaining lateral tension on the sheet material during the heating, thermo-forming, and calibration steps.

2. The method of claim 1 further comprising engaging the material and drawing it from the calibrator at a selected rate by means of a primary drive means at the outlet of the calibrator.

3. The method of claim 2 further comprising transmitting the sheet material in a direction of travel from the supply to the forming rollers at a selected rate by means of a secondary drive means.

4. The method of claim 3 wherein the drive rate of the primary drive means is greater than the drive rate of the secondary drive means for imparting tension on the sheet material as it is drawn through the forming rollers and the calibrator.

5. The method of claim 2 wherein the primary drive means includes a pair of rollers at least one of which has a plurality of spaced apart annular drive members for engaging deformations in the sheet material from one side thereof and the other roller engages a sheet material opposite the annular drive members.

6. The method of claim 5 wherein the annular drive member and the backup roller each include a resilient cover for frictionally engaging opposite sides of the sheet and preventing damage thereto as the sheet is drawn through the apparatus.

7. The method of claim 1 further comprising trimming the corrugated sheet to form corrugated sheet of a selected width.

8. The method of claim 1 further comprising cutting the corrugated sheet to selected lengths.

9. The method of claim 1 wherein the material in sheet form is heated in a first heating zone for raising the temperature of the sheet from ambient gradually to a temperature near about one half the forming temperature.

10. The method of claim 9 wherein the material in sheet form is then heated in a second heating zone for raising the temperature of the sheet to near the forming temperature.

11. The method of claim 10 wherein the second heating zone has a temperature gradient being greater near marginal edges and lesser near the center of the sheet.

12. The method of claim 11 wherein the material in sheet form is then heated in a third heating zone for maintaining the temperature of the sheet at the forming temperature immediately prior to thermo-forming.

13. The method of claim 1 wherein the material in sheet form is heated in at least one heating zone having a temperature gradient being greater near marginal edges of the sheet than near the center of the sheet.

14. The method of claim 1 wherein the material in sheet form is carried by a carrier comprising a pair of elongated endless members located laterally of the sheet material including spaced apart pin members carried on the endless members for perforating the sheet.

15. The method of claim 14 wherein the endless members include a pair of chains adapted for endless travel between heating and thermo-forming.

16. The method of claim 15 wherein the chains further include a plurality of interconnected links and a plurality of pin members extending radially outward of the links for engaging and perforating the sheet material between heating and thermo-forming.

17. The method of claim 1 wherein the corrugated sheet is calibrated by calibrating means comprising a plurality of elongated calibrating members each having a shaped surface for engaging the corrugated sheet, said surface disposed in interdigitated confronting relationship.

18. The method of claim 17 wherein the calibrating means further includes means in the form of a plurality of channels formed opposite the shaped surfaces for receiving a cooling fluid therethrough.

19. The method of claim 17 wherein the calibrating means further includes spacer means disposed between the calibrating members.

20. The method of claim 17 wherein first and second sets of calibrating members and spacers are located in opposite confronting relation for maintaining the thermo-formed corrugations in the sheet until the temperature of the sheet falls below the glass transition temperature.

21. The method of claim 1 wherein the material in sheet form is calibrated by calibrator means comprising an inlet having a surface transverse to the sheet in closely conforming relationship with the forming rollers whereby the corrugated sheet is immediately captured in the calibrator subsequent to thermo-forming.

22. The method of claim 1 further comprising cooling the corrugated sheet by cooling means downstream of the calibrator means.

23. The method of claim 22 wherein the cooling means comprises a pair of fluid cooled platens disposed for receiving the sheet material therebetween.

24. The method of claim 22 wherein the cooling means comprises a blower.

25. The method of claim 1 wherein the material in sheet form is thermo-formed by forming rollers each comprising a drive roller of a selected diameter and a plurality of annular forming rollers secured to the drive roller in a selected spaced apart relation therealong.

26. The method of claim 25 wherein the annular forming rollers are removably located on the drive roller.

27. The method of claim 25 wherein the annular forming rollers are uniformly spaced along the drive roller.

28. The method of claim 25 wherein a pair of the forming rollers are disposed so that the annular members of one roller are located axially between and in spaced relation with the annular members of the other roller.

29. The method of claim 25 wherein each annular forming roller has a selected profile for forming a corresponding profile in the sheet material.

* * * * *